(12) United States Patent
Siciak et al.

(10) Patent No.: US 8,706,384 B2
(45) Date of Patent: Apr. 22, 2014

(54) DETERMINATION OF AN OVERSPEED-SHUTDOWN EVENT IN A COMBUSTION ENGINE

(75) Inventors: Ray Siciak, Redmond, WA (US); John Cotter, Portland, OR (US); Bryan Hunt, Seattle, WA (US)

(73) Assignee: PACCAR Inc, Bellevue, WA (US)

( * ) Notice: Subject to any disclaimer, the term of this patent is extended or adjusted under 35 U.S.C. 154(b) by 1017 days.

(21) Appl. No.: 12/777,154

(22) Filed: May 10, 2010

(65) Prior Publication Data

US 2011/0271928 A1  Nov. 10, 2011

(51) Int. Cl.
  *F02D 17/04* (2006.01)
(52) U.S. Cl.
  USPC ........................................ 701/107; 123/198 D
(58) Field of Classification Search
  USPC ............. 123/198 D, 198 DA, 198 DB, 179.3, 123/179.4; 73/1.58, 1.63; 116/39, 201; 137/50; 701/107
  See application file for complete search history.

(56) References Cited

U.S. PATENT DOCUMENTS

| | | | |
|---|---|---|---|
| 2,131,264 A | | 9/1938 | Benjamin |
| 2,712,813 A | | 7/1955 | Thomas |
| 3,794,003 A | * | 2/1974 | Reddy .......................... 123/325 |
| 4,092,970 A | | 6/1978 | Ball |
| 4,106,469 A | * | 8/1978 | Dey ....................... 123/198 DB |
| 4,282,838 A | | 8/1981 | Davidson |
| 4,350,053 A | | 9/1982 | Folger |
| 4,387,679 A | | 6/1983 | Folger |
| 4,485,767 A | * | 12/1984 | Baltz ......................... 123/198 D |
| 5,279,270 A | | 1/1994 | Ichikawa |
| 5,450,321 A | | 9/1995 | Crane |
| 6,276,328 B1 | | 8/2001 | Denton |

* cited by examiner

*Primary Examiner* — Stephen K Cronin
*Assistant Examiner* — Arnold Castro
(74) *Attorney, Agent, or Firm* — Christensen O'Connor Johnson Kindness PLLC

(57) ABSTRACT

Methods and systems are provided for detecting an overspeed shutdown condition of an internal combustion engine. The pressure within an air-intake manifold of the engine is measured, and that pressure is compared to a predetermined pressure, which represents the pressure within the air-intake manifold when an overspeed-shutdown mechanism has not been activated. Activation of the overspeed-shutdown mechanism is indicated when comparing the measured pressure value to the predetermined value results in the measured value being less than the predetermined value.

13 Claims, 5 Drawing Sheets

DETERMINATION OF AN OVERSPEED-SHUTDOWN EVENT IN A COMBUSTION ENGINE

BACKGROUND

Overspeed-prevention mechanisms are typically integrated into vehicular diesel engines to protect the engine from operating at speeds above a set limit. Such limits may be in place to prevent the vehicle from traveling above a certain speed, prevent runaway acceleration, or engine over-revving.

Overspeed-shutdown mechanisms known in the prior art utilize a means for detecting the overspeed condition and, upon detection, a means for remedying the overspeed condition (e.g., by eliminating air in the air-intake manifold, or eliminating fuel to the engine).

One example of an overspeed-shutdown mechanism is described in U.S. Pat. No. 4,282,838 (the '838 patent), wherein a flyweight mechanism acts to activate a valve that in turn shuts off air to the intake manifold when the engine is in an overspeed condition.

Typically, a reset lever must be manually actuated to reverse the overspeed-shutdown mechanism. For example, in the '838 patent, after the overspeed-shutdown mechanism has been activated, in order to restore engine operation, a lever must be moved to release the shutoff valve blocking the air intake manifold.

A diagrammatic illustration of a prior art overspeed-shutdown mechanism 61 attached to an engine 55 is illustrated in FIG. 1. The engine 55 receives air provided by an air source 60 (e.g., the compressor of a turbocharger) through the air-intake manifold 57. Airflow is illustrated as arrows in FIGS. 1, 3A, and 3B. If an overspeed event occurs in the engine 55, the overspeed-shutdown mechanism 61 acts to shut down the engine 55. For example, mechanism 61 actuates a valve 62 which closes air-intake manifold 57, resulting in a loss of combustion air to the engine 55, thus precluding internal combustion and shutting down the engine 55.

A typical process flow for an air-intake overspeed-shutdown mechanism (e.g., as illustrated in FIG. 1) is illustrated in the flow chart of FIG. 2. The overspeed-shutdown process 100 begins with a step 105 wherein the engine speed exceeds a predetermined limit. When the predetermined speed is exceeded, a step 110 is implemented whereby the overspeed-shutdown function is automatically activated. The overspeed-shutdown process 100 continues with a step 115 wherein the output to the overspeed-shutdown valve is activated, thus closing off air intake to the engine. As a result of air being cut off from the engine, the engine shuts down in step 120. This ends the overspeed-shutdown process 100.

After an overspeed-shutdown mechanism has been activated, the engine will not operate. For example, after an air-intake shutdown has occurred, no air will be allowed into the engine, fuel will not combust, and the engine will not start. Without knowledge of an overspeed shutdown occurrence, the user of a shut-down engine may erroneously believe that a mechanical failure has occurred elsewhere in the engine without realizing that the overspeed-shutdown mechanism has been activated. A common response of a user in such a situation is to turn the key of the vehicle to engage the starter, so as to restart the engine. However, without air being allowed into the engine, the starter will turn over, yet the engine itself will not start. Damage to the starter system may result from repeated attempts at starting when the overspeed-shutdown mechanism has been activated and not reset.

Additionally, possible damage to the engine as a result of a vacuum shutdown is not limited to just the starter system. A diesel engine is designed to contain an explosion and harness its energy, not hold a vacuum. The internal components are biased/optimized for the engine's primary task. Thus, damage to engine components may result from allowing the engine to continue to pull a vacuum against a blockage.

What is desired, therefore, is a method and system for detecting when an overspeed-shutdown mechanism has been activated in a vehicular internal combustion engine, such information can be used to protect a vehicular starting system by preventing its engagement when such an overspeed shutdown condition exists.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Methods and systems are provided for detecting an overspeed shutdown condition of an internal combustion engine (e.g., a diesel engine). The pressure within an air-intake manifold of the engine is measured, and that pressure is compared to a predetermined pressure, which represents the pressure within the air-intake manifold when an overspeed-shutdown mechanism has not been activated. While pressure within the air-intake manifold will vary during normal engine operation (e.g., idling, acceleration, deceleration, etc.), the pressure will be significantly less after engagement of the overspeed-shutdown mechanism than during normal engine operation, thus allowing the system to distinguish between an engine shut down by an overspeed mechanism and an engine under normal operation. If comparing the measured pressure value to the predetermined value results in the measured value being less than the predetermined value, then the overspeed-shutdown mechanism has been activated.

Detection of an overspeed shutdown condition can be used to protect the starter of the engine by preventing cranking of the starter when the overspeed shutdown condition has been detected.

DESCRIPTION OF THE DRAWINGS

The foregoing aspects and many of the attendant advantages of the described matter will become more readily appreciated as the same become better understood by reference to the following detailed description, when taken in conjunction with the accompanying drawings, wherein.

DETAILED DESCRIPTION

Methods and systems are provided for detecting an overspeed shutdown condition of an internal combustion engine (e.g., a diesel engine). In a specific embodiment, the pressure within an air-intake manifold of the engine is measured, and that pressure is compared to a predetermined pressure, which represents the pressure within an air-intake manifold when the overspeed-shutdown mechanism has not been activated. Activation of the overspeed-shutdown mechanism is indicated when comparing the measured pressure value to the predetermined value results in the measured value being less than the predetermined value. In accordance with embodiments described herein, additional actions can be taken (e.g., disabling the starter or alerting the user) if activation of the overspeed-shutdown mechanism is detected.

Figure 1:
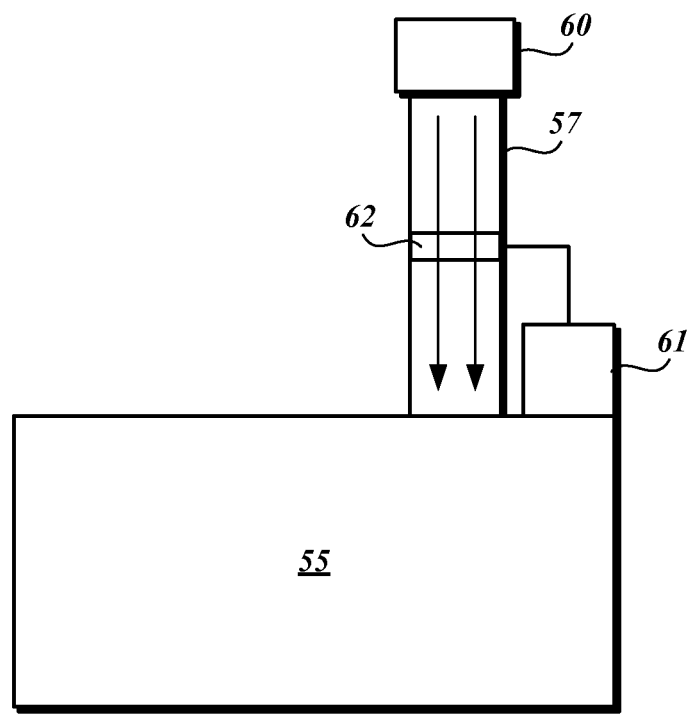
FIG. 1 is a diagrammatic illustration of a diesel engine and an overspeed-shutdown mechanism, as known in the prior art.
Figure 2:
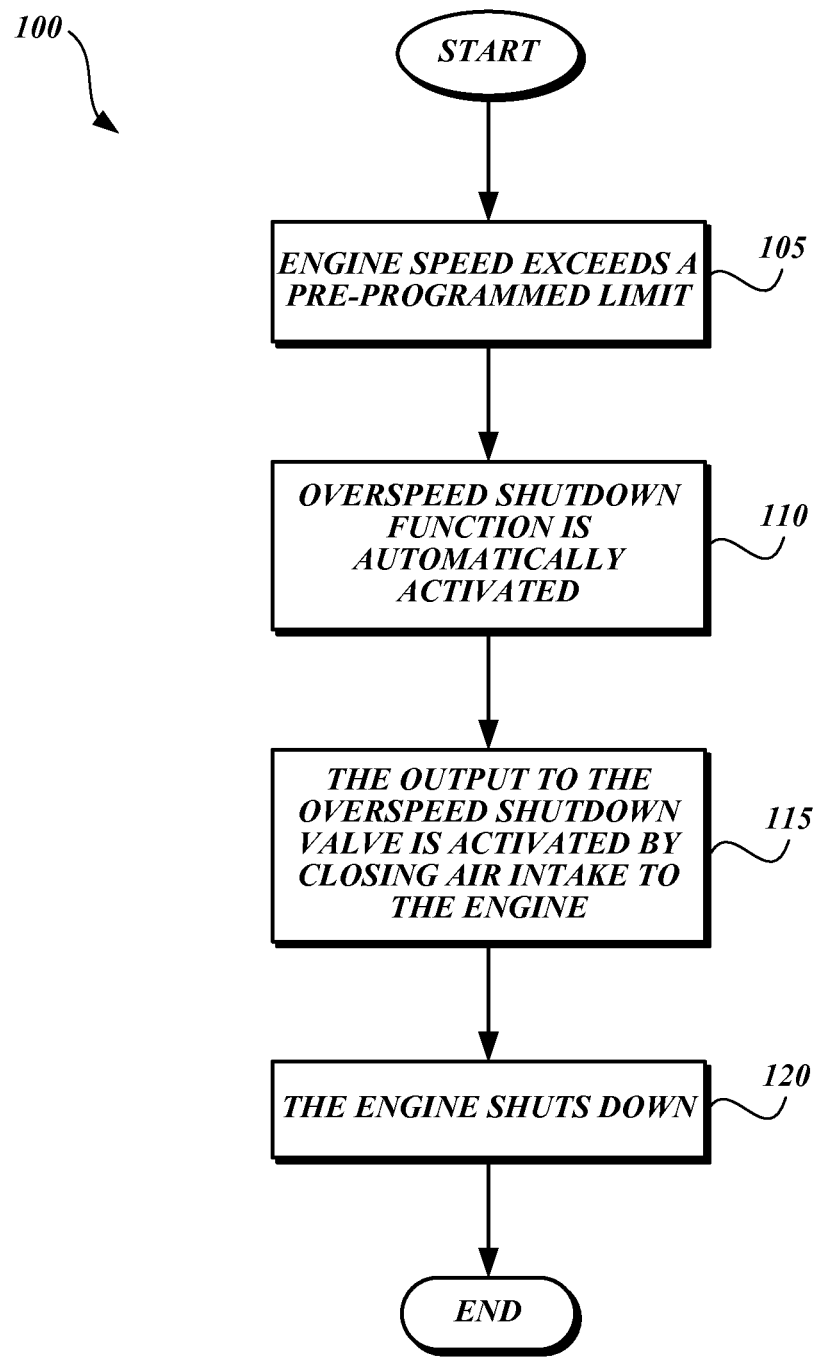
FIG. 2 is a flow chart illustrating a typical sequence of the events leading to an overspeed shutdown of an engine, as known in the prior art.
Figure 3A:
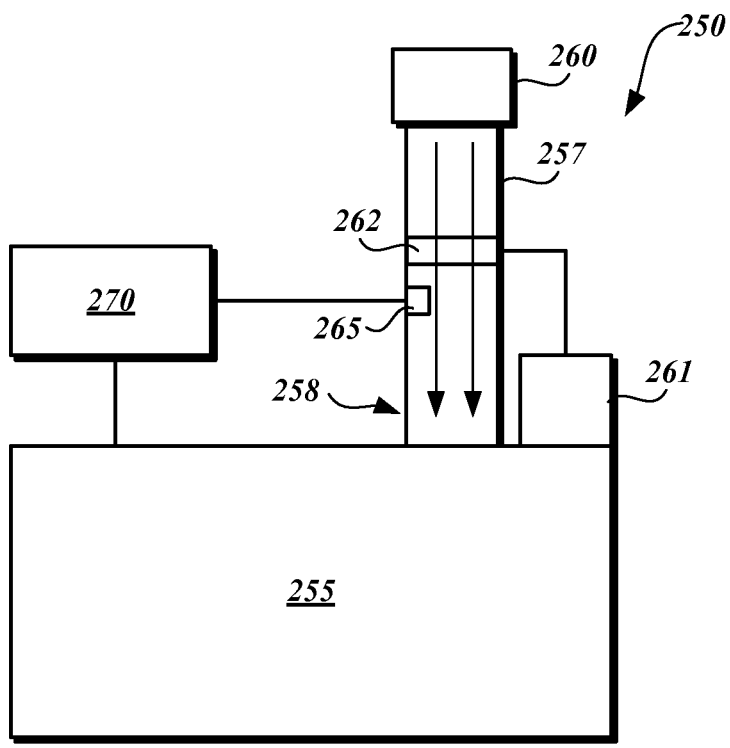
FIGS. 3A and 3B are diagrammatic illustrations of a representative system for detecting an overspeed shutdown condition in a diesel engine both before (FIG. 3A) after (FIG. 3B) overspeed shutdown, in accordance with the provided embodiments.
Figure 3B:
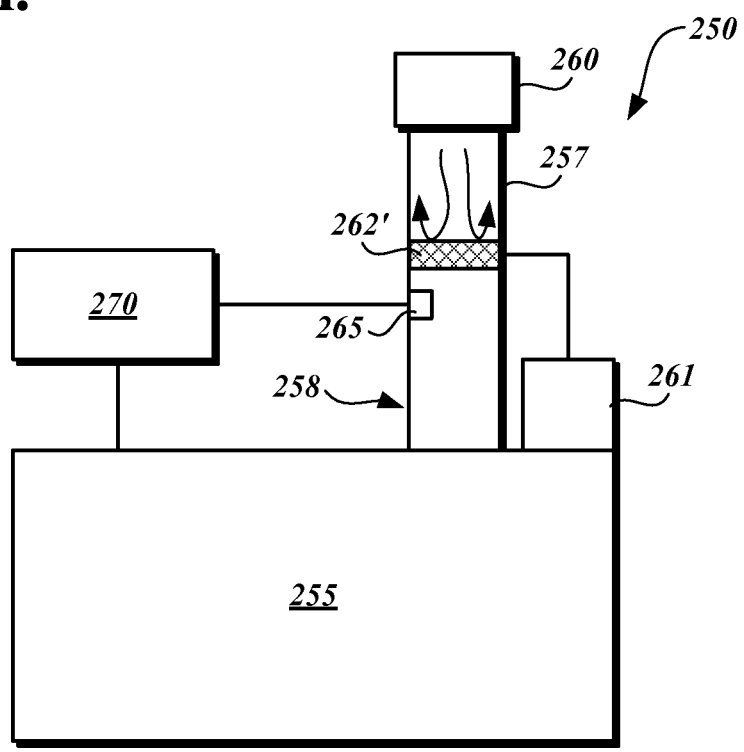

The methods and systems provided will now be described with reference to FIGS. 3A-5. Referring to FIGS. 3A and 3B, a vehicular diesel engine and related air-intake system 250 are schematically illustrated. The system 250 includes an engine 255 that is supplied air (oxygen) from an air source 260 (e.g., the compressor of a turbocharger) via an air-intake manifold 257.

An overspeed-shutdown mechanism 261 detects if an overspeed condition of the engine 255 has occurred. Overspeed-shutdown mechanisms 261 are known to those of skill in the art. See, for example, the flyweight mechanism of the '838 patent. In the exemplary shutdown mechanism of the '838 patent, when an overspeed-shutdown condition occurs, the flyweight mechanism triggers a series of mechanical connections that actuate a shut off valve, resulting in elimination of air intake to the engine. Without a supply of combustion air to the engine, combustion of fuel ceases and engine shutdown results. Because the engine continues to operate for a short amount of time after the air supply has been cut off, a vacuum develops in the engine as combustion continues until the air is insufficient to support further combustion. Thus, a shutdown engine results in a vacuum (or otherwise reduced pressure) within the air-intake manifold.

In the illustrated embodiments, when an overspeed condition is detected, the overspeed-shutdown mechanism 261 operates a shut-off valve 262 to restrict air to the engine 255. In FIG. 3A, the shut-off valve 262 is in an open position (allowing air to pass). Air-intake shut-off valves 262 are known to those of skill in the art and can take the form of a butterfly valve. The embodiments described herein are not limited to any particular type of overspeed-shutdown mechanism 261 or shut-off valve 26.

In FIG. 3B, the system 250 has experienced an overspeed event, and the shut-off valve 262' is in a closed position, thus restricting air to the engine 255.

In the representative embodiment illustrated in FIGS. 3A and 3B, the system 250 includes a pressure sensor 265 configured to measure the air pressure in a lower portion 258 of the air-intake manifold 257. The manifold lower portion 258 is intermediate the shut-off valve 262 and the engine 255. The pressure sensor 265 measures the pressure within the manifold lower portion 258 and conveys the measurement to a controller 270. The pressure sensor 265 can be any pressure sensor known to those of skill in the art suitable to measure pressure within an air-intake manifold of an internal combustion engine. The output of the pressure sensor 265 can be mechanical, electrical, or other type of indication, so long as the output is correlated to the measured pressure. In a representative embodiment, an analog electrical pressure sensor is used, and the output electrical signal represents the measured pressure.

In the exemplary embodiment where the pressure sensor 265 is electronic, the controller is an electronic logic device (e.g., a microcomputer, application-specific integrated circuit (ASIC), field-programmable gate array (FPGA), or the like) configured to compare the signal received from the pressure sensor 265 to a predetermined signal value that represents a predetermined pressure within the lower portion 258 when the overspeed-shutdown mechanism 261 has not been activated.

Regarding exemplary operating pressures, when operating a diesel engine (e.g., a turbocharged diesel engine) there is typically a positive pressure (0-30 psi gauge). When an obstruction is placed in the intake (e.g., as a result of an overspeed shutdown mechanism, the pressure will become negative (e.g., less than 0 psi gauge).

The controller 270 is also operatively connected to both the pressure sensor 265 and the engine 255. In the event of an overspeed condition detection by the controller 270, the engine 255 operation can be adjusted accordingly (e.g., inhibited from operation by the controller).

The predetermined pressure represents the pressure within the manifold lower portion 265 if the shut-off valve 262 is open (i.e., the overspeed-shutdown mechanism 261 has not been activated). The controller 270 compares the measured pressure to the predetermined pressure to determine if the overspeed-shutdown mechanism 261 has been activated, as described further with regard to FIG. 4.

Figure 4:
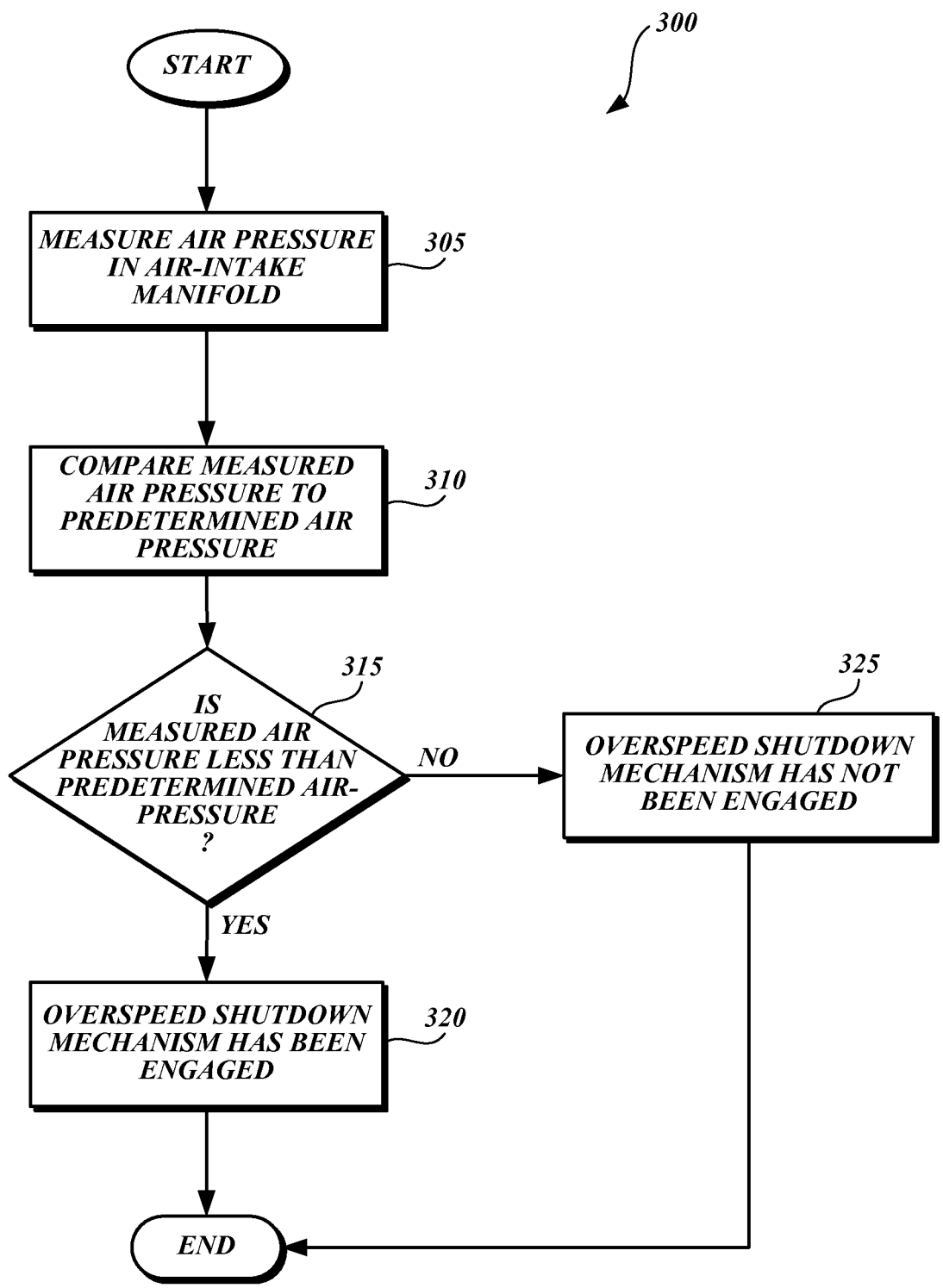
FIG. 4 is a flow chart illustrating a method for determining if an engine overspeed-shutdown mechanism has been activated, in accordance with the provided embodiments.

A method for detection of an overspeed shutdown is illustrated in the flow chart of FIG. 4.

The method 300 begins with a step 305, wherein the air pressure in the air-intake manifold is measured (e.g., using a pressure sensor 265, as described above).

In step 310, the measured air pressure is compared to a predetermined air pressure. The predetermined air pressure represents the air pressure in the air-intake manifold when an overspeed-shutdown mechanism has not been activated.

In step 315, a decision is made based on whether the measured air pressure is less than the predetermined air pressure. If the measured air pressure is less than the predetermined air pressure, the method 300 indicates that the overspeed-shutdown mechanism has been engaged 320, and the method 300 ends. If the measured air pressure is greater than or equal to the predetermined air pressure, the method 300 indicates that the overspeed-shutdown mechanism has not been engaged 325, and the method 300 ends.

In one embodiment, the decision of step 315 is made using a controller 270, as described above. The decision of step 315 can also be made using mechanical or simple electronic means, as well. For example, a mechanical air-pressure sensor can be used and a pressure set point established so that when the pressure sensor registers a pressure below the set point during engine operation, an overspeed shutdown would be indicated.

In accordance with the embodiments described herein, when an overspeed-shutdown mechanism has been engaged as determined at step 320, an indication detectable by an operator of the engine can be provided. Such type of indication can be in the form of a visual or an audio signal. Examples of visual signals include indicator lights on the vehicle dashboard. Examples of an audio signal include a beep or buzz.

Figure 5:
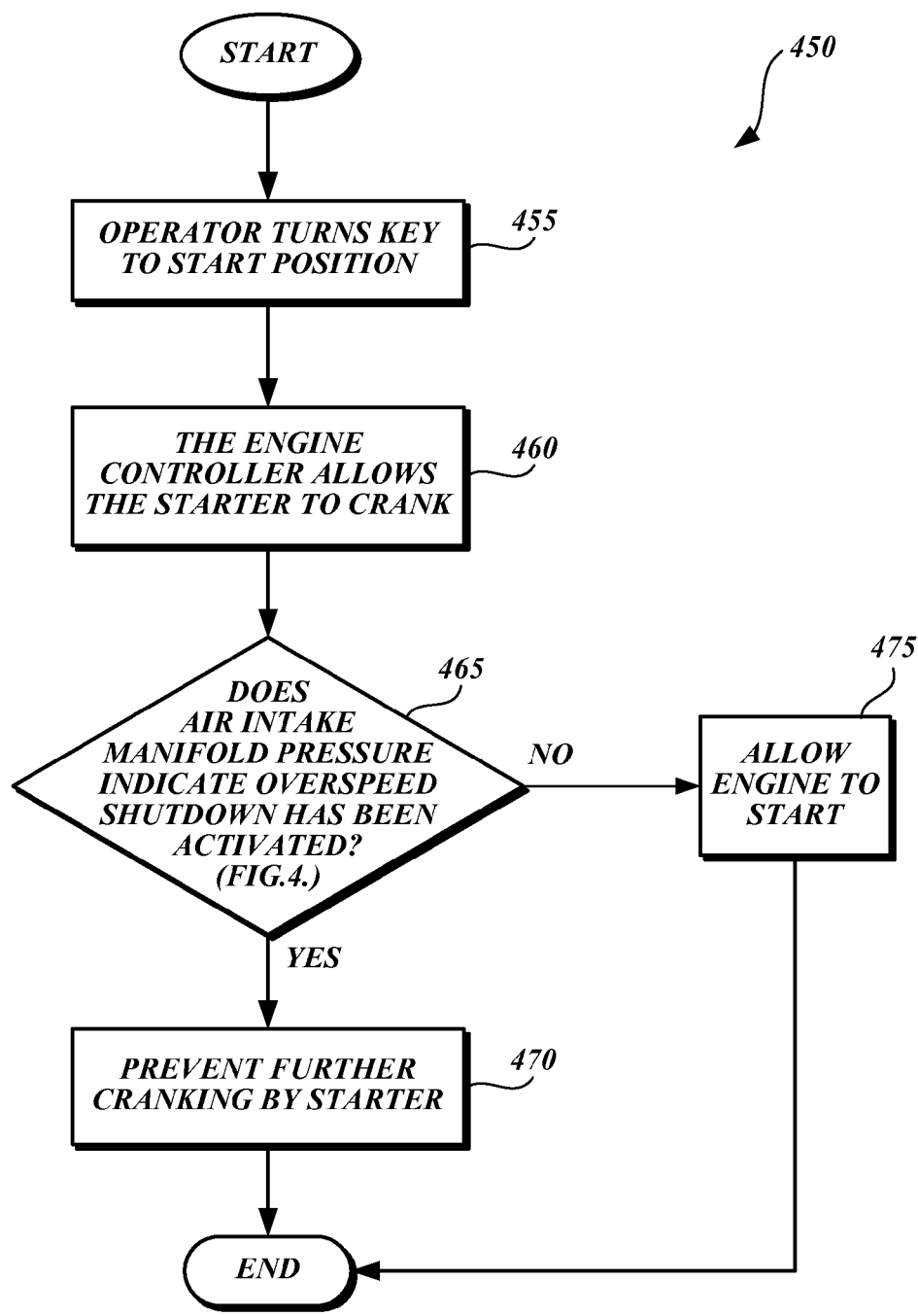
FIG. 5 is a flow chart illustrating a method for protecting an engine starter from cranking if an overspeed-shutdown mechanism has been activated, in accordance with the provided embodiments.

The flow chart of FIG. 5 illustrates a method whereby a starter of an engine is prevented from cranking if an overspeed-shutdown mechanism has been activated.

The method 450 begins with a step 455, wherein the operator turns the key (e.g., of a vehicle) to a start position.

In step 460, the engine controller (e.g., a control computer) allows the starter to crank.

In step 465, a decision relies on whether the air intake manifold pressure indicates that an overspeed-shutdown mechanism has been activated (i.e., the method of FIG. 4). This decision includes comparing the measured air pressure within the air intake manifold to a predetermined pressure. The predetermined pressure is representative of the minimum air pressure in the air intake manifold when the overspeed-shutdown mechanism has not been activated. If the air pressure measured in the air intake manifold is less than the predetermined pressure, it is determined that the overspeed-shutdown mechanism has been activated.

When it is determined that the overspeed-shutdown mechanism has been activated at step 465, the method 450 proceeds to step 470, wherein further cranking by the starter is prevented, thus protecting the starter from cranking when starting of the engine is not possible (e.g., due to no air flow to the engine). Preventing the starter from cranking is accomplished, in one embodiment, by the controller 270 sending a signal to the starter causing it to cease functioning.

If, in step 465, the air pressure measured in the air intake manifold is greater than or equal to the predetermined set pressure, the method 450 proceeds to step 475 and the engine is allowed to start.

The method 450 ends when either the engine is allowed to start 475 or further cranking by the starter is prevented 470.

In an alternative embodiment of the above-described methods, the controller (e.g., a computer controller) determines if an overspeed shutdown has occurred by determining the pressure within the air intake manifold relative to the predetermined pressure, as provided herein. If an overspeed event has been detected, the controller informs the operator of the overspeed condition (e.g., via message to the operator, such as by illuminating a portion of a display, sounding a buzzer, etc.). The controller additionally inhibits the starter (e.g., the started is not allowed to crank). The operator is required to reset the overspeed shutdown mechanism (e.g., valve), at which point the controller allows the engine to start.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for determining if an overspeed-shutdown mechanism of an internal combustion engine has been activated, the method comprising:
    (a) determining a first air pressure within an air intake manifold of the engine;
    (b) comparing the first air pressure to a predetermined air pressure value, wherein the predetermined air pressure value is representative of an air pressure within the air intake manifold when the overspeed-shutdown mechanism has not been activated; and
    (c) providing an indication detectable by an operator of the engine if the first air pressure is less than the predetermined air pressure.

2. The method of claim 1, further comprising preventing the engine from operating if the first air pressure is less than the predetermined air pressure.

3. The method of claim 2, wherein preventing the engine from operating comprises disabling a starter for the engine.

4. The method of claim 2, wherein preventing the engine from operating comprises eliminating flow of fuel to the engine.

5. The method of claim 1, wherein the internal combustion engine is a diesel engine.

6. A system for determining if an overspeed-shutdown mechanism has been activated in an internal combustion engine, comprising:
    (a) an air pressure sensor within an air intake manifold of the engine;
    (b) an engine controller configured to:
        (i) receive a first signal from the air pressure sensor indicative of a measured air pressure of the air intake manifold;
        (ii) compare the first signal to a predetermined signal value that is representative of air pressure within the air intake manifold when the overspeed-shutdown mechanism has not been activated;
        (iii) output a second signal based on the results of the comparison of the first signal and the predetermined signal value; and
        (iv) indicate that the overspeed shutdown mechanism has been activated when the measured air pressure is less than the predetermined air pressure.

7. The system of claim 6, wherein the engine controller is further configured to prevent the engine from operating if the measured air pressure is less than the predetermined air pressure.

8. The system of claim 7, wherein the engine controller prevents the engine from operating by disabling a starter for the engine.

9. The system of claim 7, wherein the engine controller prevents the engine from operating by eliminating flow of fuel to the engine.

10. The system of claim 6, wherein the internal combustion engine is a diesel engine.

11. A system for determining if an overspeed-shutdown mechanism has been activated in an internal combustion engine, comprising:
    (a) an air-pressure sensor within an air intake manifold of the engine;
    (b) a means for detecting the air pressure measured by the air pressure sensor;
    (c) a means for comparing the detected air pressure measured by the air pressure sensor to a predetermined air pressure that is representative of an air pressure within the air intake manifold when the overspeed-shutdown mechanism has not been activated; and
    (d) a means for providing an indication detectable by an operator of the engine if the detected air pressure is lower than the predetermined air pressure.

12. The system of claim 11, further comprising a means for preventing the engine from operating if the detected air pressure is lower than the predetermined air pressure.

13. The system of claim 11, wherein the internal combustion engine is a diesel engine.

* * * * *